United States Patent [19]
Hirano et al.

[11] Patent Number: 5,485,266
[45] Date of Patent: Jan. 16, 1996

[54] LASER BEAM SURVEY INSTRUMENT HAVING A TILTABLE LASER BEAM AXIS AND TILT DETECTORS

[75] Inventors: Satoshi Hirano; Hirofumi Shinozaki, both of Tokyo, Japan

[73] Assignee: Kabushiki Kaisha TOPCON, Tokyo, Japan

[21] Appl. No.: 60,905

[22] Filed: May 12, 1993

[30] Foreign Application Priority Data

Jul. 9, 1992 [JP] Japan ..................................... 4-206014

[51] Int. Cl.$^6$ ................................................. G01B 11/26
[52] U.S. Cl. ................................ 356/249; 33/281; 33/291
[58] Field of Search .................................... 356/138, 149, 356/150, 152, 248, 249, 250, 399, 400; 33/281, 282, 285, 286, 290, 291, 292, DIG. 21

[56] References Cited

U.S. PATENT DOCUMENTS 4,062,634 12/1977 Rando et al. ............................ 356/248
4,629,321 12/1986 Hart et al. ............................... 356/148

Primary Examiner—Samuel A. Turner
Attorney, Agent, or Firm—Nields & Lemack

[57] ABSTRACT

According to the present invention, fixed tilt detectors are fixed in planes crossing perpendicularly to each other of shaft center of a laser projector, and tilting tilt detectors are mounted on a plate, which is tiltable with respect to shaft center of the laser projector. The laser projector is leveled in such manner that the fixed tilt detectors indicate horizontal direction or tilting tilt detectors aligned with the fixed tilt detectors indicate horizontal direction, and horizontal reference plane is obtained. The tilting tilt detectors are tilted with the fixed tilt detectors as reference, and the laser projector is leveled so that the tilted tilting tilt detectors indicate horizontal direction, and reference plane tilted at an arbitrary angle is obtained.

7 Claims, 6 Drawing Sheets

LASER BEAM SURVEY INSTRUMENT HAVING A TILTABLE LASER BEAM AXIS AND TILT DETECTORS

BACKGROUND OF THE INVENTION

The present invention relates to a laser beam survey instrument, in which a laser beam can be projected at an arbitrary tilt angle to a horizontal plane.

Among conventional type laser survey instruments, there may be mentioned instruments which form a horizontal reference line by projecting a laser beam in a horizontal direction, instruments which form a horizontal reference plane by scanning a laser beam in a horizontal plane or by spreading a laser beam in a plane by means of a conical prism.

Among such laser survey instruments, there has been proposed an instrument, which comprises a tilt detector integrally fixed with a laser projector, and the laser projector is titled according to signal from the tilt detector, and it is designed that the laser beam is always directed horizontally even when the laser survey instrument is installed at a tilted position.

Also, there has been proposed an instrument, in which a laser beam is not only projected in a horizontal direction but also can be projected at a desired tilt angle with the horizontal plane as a reference.

When it is desired to tilt the laser beam from the laser projector at an arbitrary angle in the conventional type of laser survey instrument, the tilt detector is first tilted at a desired angle to the laser projector. Then, the laser projector is tilted so that the tilt detector is at the horizontal position, and the laser beam is projected at a desired tilt angle.

As described above, in the conventional type of laser survey instrument, the tilt detector is tilted with respect to the laser projector each time the reference plane is set at an arbitrary angle. As a result, if there is an error in the tilt drive unit of the tilt detector, positioning deviation occurs in each setting operation. Therefore, if the tilt detector with positioning deviation is taken as a reference, optical axis tilt error of the laser projector occurs. If the reference line or reference plane is formed by the laser beam, a setting error occurs. There is no way of correcting the positioning deviation. If errors are accumulated at each setting, the errors on the reference plane may reach an unallowable value.

Thus, in order to minimize the positioning deviation, a mechanical unit must be provided, which produces less error and high reproducibility in the conventional system; however, this leads to an increase in cost of production.

To solve the above problems, it is an object of the present invention to provide a laser survey instrument, in which no positioning deviation occurs between the tilt detector and the optical axis of the laser projector, and if positioning deviation does occur, it can be easily corrected.

DETAILED DESCRIPTION OF THE PREFERRED EMBODIMENT

Figure 1:
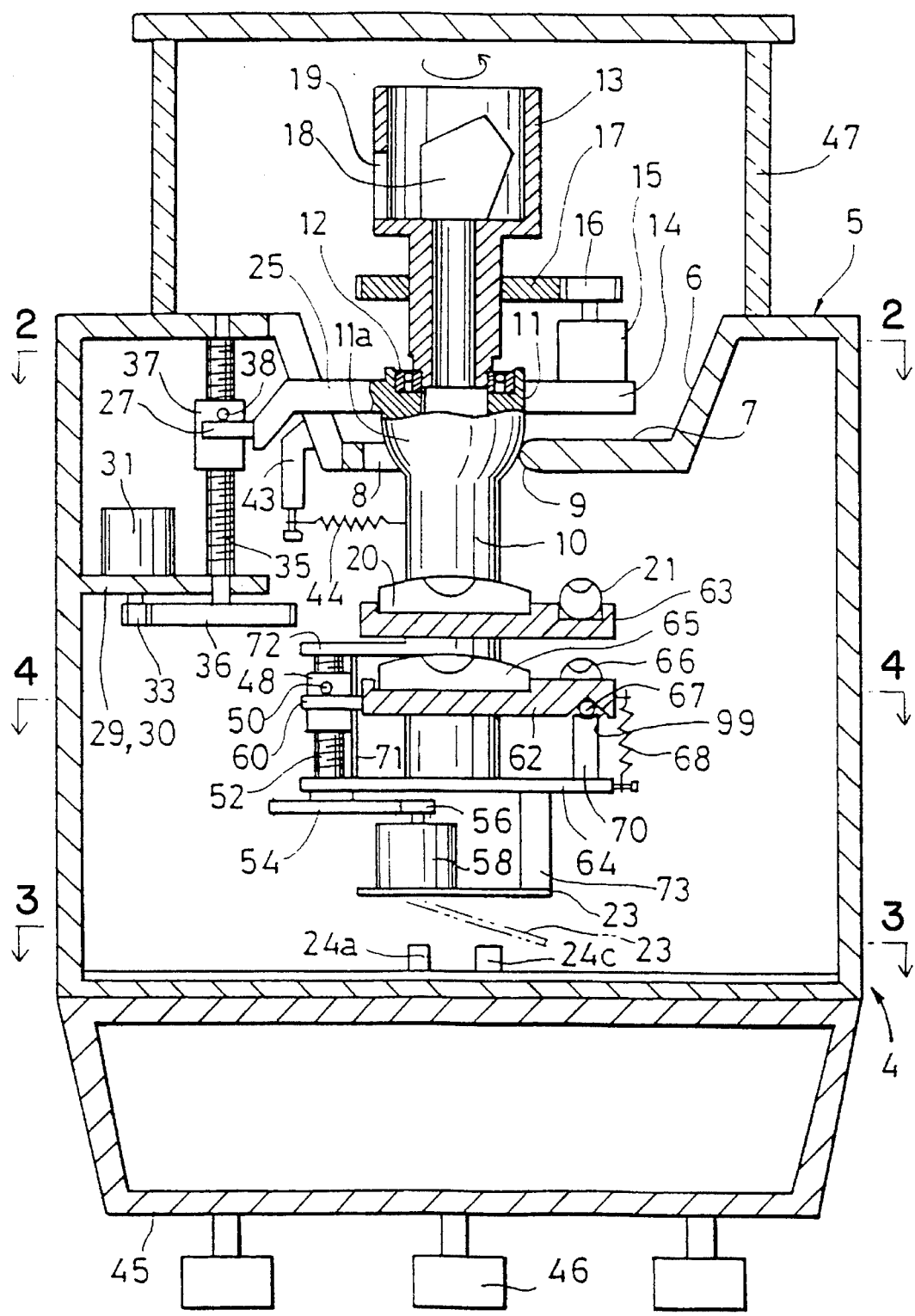
FIG. 1 is a cross-sectional view of an embodiment of the present invention.
Figure 2:
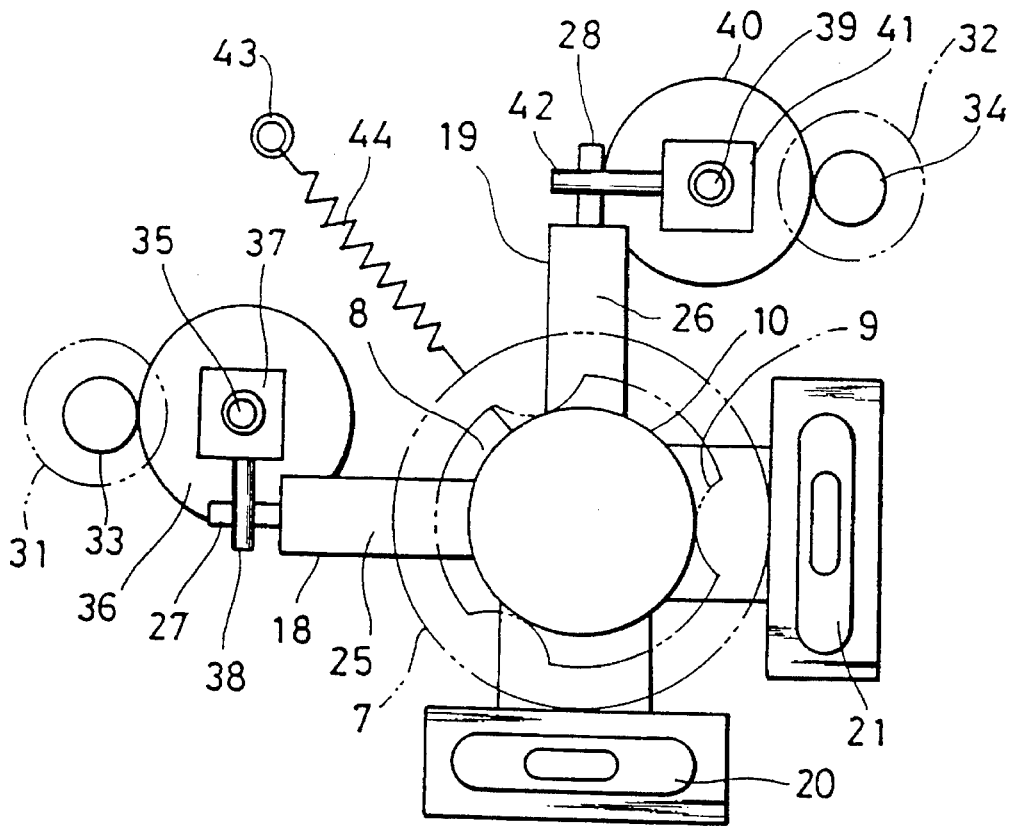
FIG. 2 is a section along the line A—A of FIG. 1.
Figure 3:
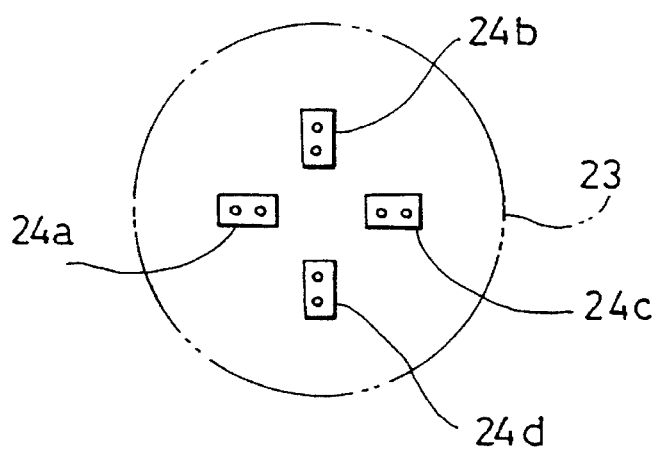
FIG. 3 is a section along the line B—B of FIG. 1.
Figure 4:
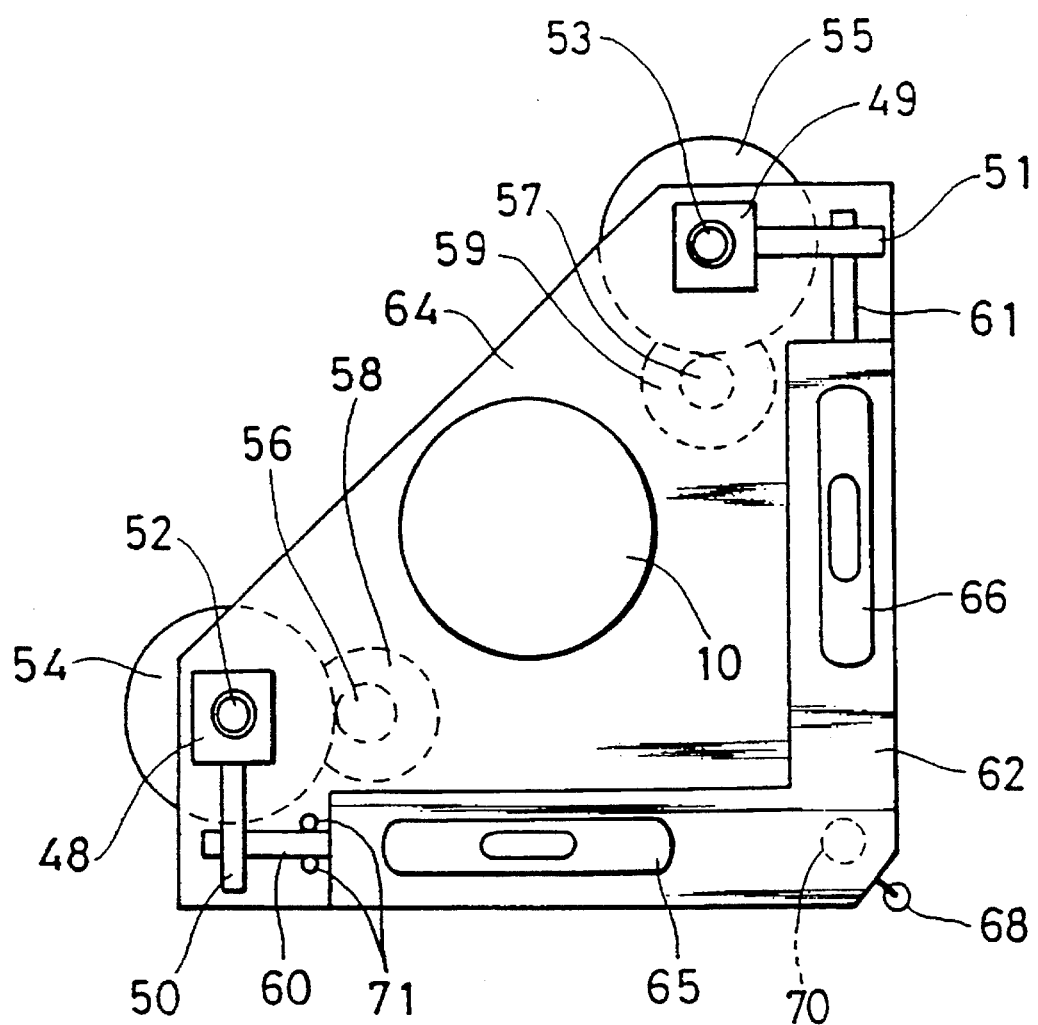
FIG. 4 is a section along the line C—C of FIG. 1.

A description will now be given of an embodiment of the present invention in connection with the drawings.

FIG. 1 to FIG. 4 show an embodiment of the present invention.

At the center of a casing 5, a recessed portion 6 in the form of a truncated cone is provided, and a support seat 7 is formed at the center of the recessed portion 6. The support seat 7 comprises three projections 9, each of which is smoothly formed by tertiary curved surface, at positions equally spaced on the inner periphery of a circular through-hole 8.

Into the through-hole 8, a laser projector 10 emitting a laser beam is placed, and a head 11 of the laser projector 10 is engaged and supported by the support seat 7. The head 11 has its lower portion in spherical form, and the spherical portion 11a is slidably abutted on said three projections 9. The laser projector 10 is supported in such manner that it can be tilted in any direction with respect to a vertical line.

A motor seat 14 is provided on the head 11. A scanning motor 15 is mounted on the motor seat 14, and a gear 16 is fixed on output shaft of the scanning motor 15. The gear 16 is engaged with a scanning gear 17 as described below.

Aligned with the shaft center of the laser projector 10 and a mirror holder 13 is rotatably mounted on the head 11 of the laser projector 10 via a bearing 12. The scanning gear 17 is fixed on the mirror holder 13, and the scanning gear 17 is engaged with the gear 16 as described above so that the mirror holder 13 can be rotated around the vertical shaft center by the scanning gear 17. A pentagonal prism 18 is mounted on the mirror holder 13, and the laser beam emitted from the laser projector 10 is projected in a horizontal direction through a projection window 19.

A sensor support shelf 63 is provided on the middle of the laser projector 10, and fixed level vials 20 and 21, serving as tilt detectors for detecting tilting with respect to a horizontal line, are placed at crossed positions on the sensor support shelf 63. Each fixed level vial is an electric level vial of electrostatic capacity detection type and issues an electric signal corresponding to the tilt angle with respect to a horizontal plane as a reference.

On the lower end of the laser projector 10, a base plate 64 approximately in form of right-angled triangle is fixed, and a pole 70 is installed near apex of the base plate 64. On the upper end of the pole 70, a sphere 67 is fixed. An L-shaped tilting plate 62 is arranged above the base plate 64, and a conical recess 99 is formed at the apex of the L-shape of the tilting plate 62. The sphere 67 is engaged with the recess 99, and the apex of the L-shape of the tilting plate 62 is supported by the pole 70. The tilting plate 62 can be pivotally moved around the sphere 67. Further, a spring 68 is provided between the tilting plate 62 and the base plate 64 to press the conical recess 99 on the sphere 67, and the tilting plate 62 is pulled clockwise in FIG. 1.

On the tilting plate 62, arbitrary angle setting level vials 65 and 66, serving as tilting tilt detectors, are arranged along the above-mentioned L-shape along the lines which cross perpendicularly to each other.

A screw supporting plate 72 is positioned under the sensor support shelf 63, and the screw supporting plate 72 is placed to protrude from the laser projector 10. At positions of the base plate 64 where a triangle is formed with the pole 70 as an apex, tilting screws 52 and 53 are rotatably mounted, and the upper end of each of the tilting screws 52 and 53 is rotatably supported on the screw supporting plate 72.

The lower end of the tilting screw 52 protrudes from the base plate 64 downwardly, and a tilting gear 54 is fixed on the protruding end of the tilting screw 52, and the tilting gear 54 is engaged with a tilting gear 56 as described later. The lower end of the tilting screw 53 protrudes downward from the base plate 64. A tilting gear 55 is fixed on the protruding end of the tilting screw 53, and the tilting gear 55 is engaged with a tilting gear 57 as described later.

A tilting nut 48 is engaged with the tilting screw 52, and a nut pin 50 with circular cross-section is arranged on the tilting nut 48 to protrude from it. From that end of the tilting plate 62 which is near the arbitrary angle setting level vial 65, a tilting pin 60 with circular cross-section protrudes parallel to the center line of the arbitrary angle setting level vial 65, and the tilting pin 60 abuts against the nut pin 50. Further, two parallel guide pins 71 bridge the gap between the base plate 64 and the screw supporting plate 72, and the tilting pin 60 is slidably squeezed by the two guide pins 71 to restrict horizontal rotation of the tilting plate 62 and to allow vertical rotation of the tilting pin 60 and rotation of the tilting pin 60 around its shaft center.

A tilting nut 49 is engaged with the tilting screw 53, and a nut pin 51 with circular cross-section is arranged on the tilting nut 49 to protrude from it. From that end of the tilting plate 62 which is near the arbitrary angle setting level vial 66, a tilting pin 61 with circular cross-section protrudes parallel to the center line of the arbitrary angle setting level vial 66, and the tilting pin 61 abuts against the nut pin 51.

A stud 73 is suspended from the lower surface of the base plate 64, and a tilt detection member 23, also serving as a motor base, is affixed to the stud 73. Tilting motors 58 and 59 are installed on upper surface of the tilt detection member 23. The tilting gear 56 is fixed on the output shaft of the tilting motor 58; the tilting gear 57 is fixed on the output shaft of the tilting motor 59; and these tilting gears 56 and 57 are engaged with the tilting gears 54 and 55 respectively.

A ring-shaped reflection mirror is arranged on the lower surface of the tilt detection member 23. At positions facing the tilt detection member 23, optical sensors 24a, 24b, 24c and 24d comprising a given number (4 in the present embodiment) of light emitting elements and light receiving elements are arranged around a common circumference around the shaft center of the laser projector 10 when the casing 5 and the laser projector 10 are at the vertical position.

From the head 11 of the laser projector 10, tilting arms 25 and 26 extend in a horizontal direction perpendicular to each other, and these arms penetrate the conical surface of the recessed portion 6, so that the tips of the arms are positioned inside the casing 5. Engaging pins 27 and 28 are arranged at the tips of the tilting arms 25 and 26 to protrude from them. The engaging pins 27 and 28 are in cylindrical form, and the axes of the cylindrical form are perpendicular to each other, and the positional relationship of the axes is determined so that they are included in a plane passing through the spherical center of the spherical portion 11a. Horizontal movement of one of the engaging pins 27 and 28, e.g. the engaging pin 27, is restricted and only vertical movement is allowed. Although not shown in the figure, there may be provided means to slidably engage the engaging pin 27 in a guide groove extending in vertical direction, or slidably press the engaging pin 27 on a wall surface extending in a vertical direction via pushing means such as a spring.

On the inner wall of the casing 5, shelf plates 29 and 30 are provided, and a level adjusting motor 31 is arranged on the shelf plate 29, and a level adjusting motor 32 is arranged on the shelf plate 30. A driving gear 33 is fixed on the rotating shaft of the level adjusting motor 31 and a driving gear 34 is fixed on the rotating shaft of the level adjusting motor 32. A screw shaft 35 running perpendicularly to the engaging pin 27 and bridging the gap between the ceiling of the casing 5 and the shelf plate 29 is rotatably arranged. A driven gear 36 is fixed on the screw shaft 35, and the driven gear 36 is engaged with the driving gear 33. A slide nut 37 is mounted on the screw shaft 35, and a pin 38 is placed on the slide nut 37 to protrude from it. The pin 38 and the engaging pin 27 slidably abut against each other.

Similarly, a screw shaft 39 running perpendicularly to the engaging pin 28 and bridging the gap between the ceiling of the casing 5 and the shaft plate 30 is rotatably arranged. A driven gear 40 is fixed on the screw shaft 39, and the driven gear 40 is engaged with the driving gear 34. A slide nut 41 is mounted on the screw shaft 39, and a pin 42 is arranged on the slide nut 41 to protrude from it. The pin 42 and the engaging pin 28 slidably abut against each other.

A spring receptacle 43 is arranged on the ceiling of the casing 5 and between the screw shafts 35 and 39, and a spring 44 is stretched between the spring receptacle 43 and the laser projector 10. The laser projector 10 is pulled clockwise by the spring 44 in FIG. 1 around the support seat 7.

In the figure, the reference numeral 45 represents a battery box to accommodate a battery to drive the laser survey instrument. A main unit 4 of the laser survey instrument is provided on a tripod (not shown) via a leveling bolt 46 for leveling. The reference numeral 47 is a glass window which surrounds the circumference of the mirror holder 13.

Figure 6:
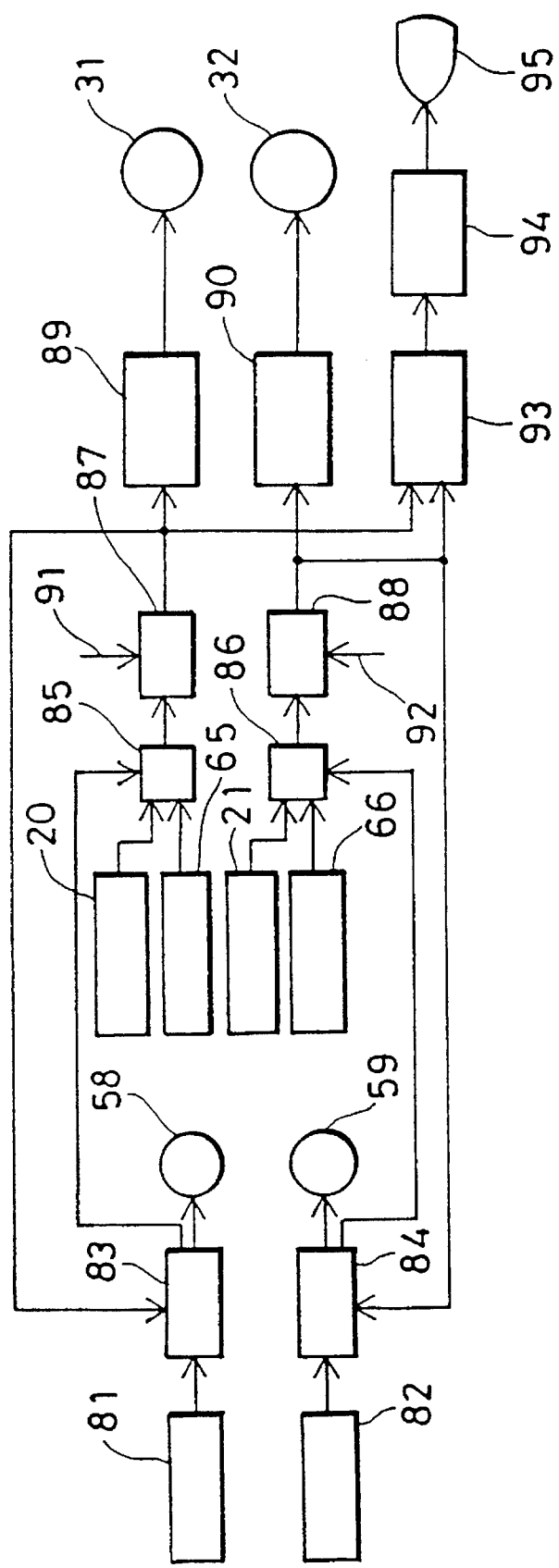
FIG. 6 is a control block diagram of the embodiment of FIGS. 1–4.

FIG. 6 shows a controller of the present embodiment.

The results of the detection of the fixed level vial 20 and the arbitrary angle setting level vial 65 are inputted to an angle detection circuit 87 via a switching circuit 85. The results of the detection of the fixed level vial 21 and the arbitrary angle setting level vial 66 are inputted to an angle detection circuit 88 via a switching circuit 86. On the angle detection circuits 88 and 87, reference angles 91 and 92 are set. These reference angles 91 and 92 are normally 0°.

When signal is inputted from the fixed level vial 20 to the angle detection circuit 87 by the switching circuit 85, the angle detection circuit 87 detects deviation from the reference angle 91. The signal of the angle detection circuit 87 is inputted to a motor controller 89, and drive control of the level adjusting motor 31 is performed by the motor controller 89.

When the signals from the fixed level vial 20 and the arbitrary angle setting level vial 65 are inputted to the angle detection circuit 87 by the switching circuit 85, the angle detection circuit 87 outputs a signal corresponding to the deviation. This signal is inputted to a tilt driving circuit 83, and drive control of the driving motor 58 is performed by the tilt driving circuit 83. When signal from the arbitrary setting level vial 65 is inputted to the angle detection circuit 87 by the switching circuit 85, the angle detection circuit 87 detects deviation from the reference angle 91. The signal of the angle detection circuit 87 is inputted to the motor controller 89, and drive control of the level adjusting motor 31 is performed by the motor controller 89.

The signal of the angle detection circuit 88 is inputted to a motor controller 90, and drive control of the level adjustment motor 32 is performed by the motor controller 90. The signal of the angle detection circuit 88 and the signal from the arbitrary angle setter 82 are inputted to the tilt driving circuit 84, and drive control of the tilting motor 59 is performed by the tilt driving circuit 84.

Angular deviation of the angle detection circuits 87 and 88 is inputted to a discriminator 93, which selects larger angular deviation out of the angular deviations of the angle detection circuits 87 and 88. The output corresponding to the change of angular deviation thus selected is outputted to a display driver 94, and the display driver 94 directs a display unit 95 to display a value corresponding to the deviation.

In the present embodiment, the reference plane formed by the laser beam can be set in a horizontal direction or at an arbitrary angle thereto. Description will now be given of the leveling operation of the above laser survey instrument when it forms a horizontal reference plane.

When a main unit 4 is installed, the laser beam axis of the laser projector 10 is generally not aligned with a vertical line in the non-adjusted state of the main unit 4, and the fixed level vials 20 and 21 are not at a horizontal position. The switching circuits 85 and 86 are set so that the signal from the fixed level vials 20 and 21 are inputted to the angle detection circuits 87 and 88, respectively.

Assuming that the reference angles 91 and 92 are each 0°, an angular deviation signal is outputted from each of the angle detection circuits 87 and 88. When these angular deviation signals are outputted, the motor controllers 89 and 90 drive the level adjusting motors 31 and 32, respectively, to a direction such that each angular deviation signal becomes 0.

The operation of the two level adjusting motors will now be described.

When the level adjusting motor 31 is driven, the rotation of the level adjusting motor 31 is transmitted to the screw shaft 35 via the driving gear 33 and the driven gear 36. With the rotation of the screw shaft 35, the slide nut 37 moves up and down. Upward or downward movement of the slide nut 37 is transmitted to the tilting arm 25 via the pin 38 and the engaging pin 27, and the laser projector 10 is tilted.

As described above, horizontal movement of the engaging pin 27 is restricted, and only vertical movement is allowed. Thus, the tilting direction of the laser projector 10 is restricted and is tilted around the axis of the engaging pin 28, which passes through the spherical center of the spherical portion 11a.

Next, when the level adjusting motor 32 is driven, the screw shaft 39 is rotated and moves the slide nut 41 up and down, and the pin 42 moves the engaging pin 38 up and down.

Horizontal movement of the engaging pin 27 is restricted by a groove (not shown), and vertical movement is restricted by the pin 38 and the spring 44. Thus, for the engaging pin 27, only the movement around its axis, passing through the spherical center of the spherical portion 11a, is allowed. When the pin 42 is moved up and down, movement in the vertical direction is given to the engaging pin 28 with sliding (in a direction toward the axis of the engaging pin 28) between the pin 42 and the engaging pin 28, and the laser projector 10 is tilted the axis center of the engaging pin 27. As described above, the engaging pin 27 has circular cross-section, and the tilt of the axis of the engaging pin 27 does not change when engaging pin 27 is rotated. That is, tilting operation of each level adjusting motor 31 or 32 does not influence the tilt of the other tilting shaft, i.e. the axis of the engaging pin 28 and 27, respectively. Therefore, tilting adjustment of one shaft can be achieved independently of the tilting adjustment of the other shaft, and the tilt adjustment and control sequence related to the tilt adjustment can be extensively simplified.

Because the laser projector 10 is pulled clockwise in FIG. 1 by the spring 44, the laser projector 10 accurately follows the movement of the slide nut 37.

In the tilting operation of the laser projector 10, the laser projector 10 is stably supported because the spherical portion 11a of the laser projector 10 is supported at three points by the projections 9 as described above. Also, the spherical portion 11a contacts the projections 9 having smooth curved surfaces, and the laser projector 10 can move smoothly and freely in any tilting direction and the position of the laser projector 10 can be easily adjusted.

As the laser projector 10 is tilted, and leveling proceeds, the detection values from the fixed level vials 20 and 21 come closer to horizontal. Finally, the angular deviation outputted by the motor controllers 89 and 90 becomes 0, and the leveling operation is completed.

Each of the fixed level vials 20 and 21 has a narrow detection range. When a given range is exceeded, the affected vial reaches a saturation state, and the tilting direction can be detected, but the value of tilt angle cannot be detected. Therefore, the optical sensors 24a, 24b, 24c and 24d are provided in such manner that the adjusting mechanism comprising the level adjusting motors 31 and 32, the driving gears 33 and 34, the driven gears 36 and 40, the screw shafts 35 and 39, the slide nuts 37 and 41, the tilting arms 25 and 26, etc. is not operated beyond mechanical adjustment range. That is, when reaching the limit of the mechanical adjustment range, light emitted from one of the optical sensors 24a, 24b, 24c or 24d is reflected on the tilt detection member 23 and is received again by the optical sensor. Thus, the reaching at the limit of the mechanical adjustment range is detected, and the level adjusting motors 31 and 32 are stopped, or the display unit displays that it is the limit of the mechanical adjustment range, or a buzzer alarm is issued.

Under such condition, coarse adjustment is performed by the leveling bolt 46 to come within the adjustment range, and leveling operation is started again.

When leveling operation is completed, a laser beam is emitted from the laser projector 10. Further, the scanning motor 15 is driven to rotate the laser projector 10 around a vertical axis. The laser beam is emitted in a horizontal direction from the pentagonal prism 18, and a horizontal reference plane made by the laser beam is formed by further rotation.

In the process of the leveling operation, some time is required from the onset of leveling to the completion. During this period, the progress of the leveling operation is indicated to the operators to inform them that the leveling operation is adequately performed to eliminate anxiety of the operators.

By the discriminator 93, the magnitude of angular deviation outputted from the angle detection circuits 87 and 88 is observed, and larger angular deviation is selected. The condition of change in the selected angular deviation is outputted to the display driver 94, and display content is changed according to the change of angular deviation and it is directed on the display unit 95.

Larger angular deviation is selected because more time is required for angle adjustment when angular deviation is larger. Instead of the magnitude of angular deviation, the sum of angular deviations outputted from the angle detection circuits 87 and 88 is obtained, and display content may be altered according to the sum of the angular deviations.

Figure 7:
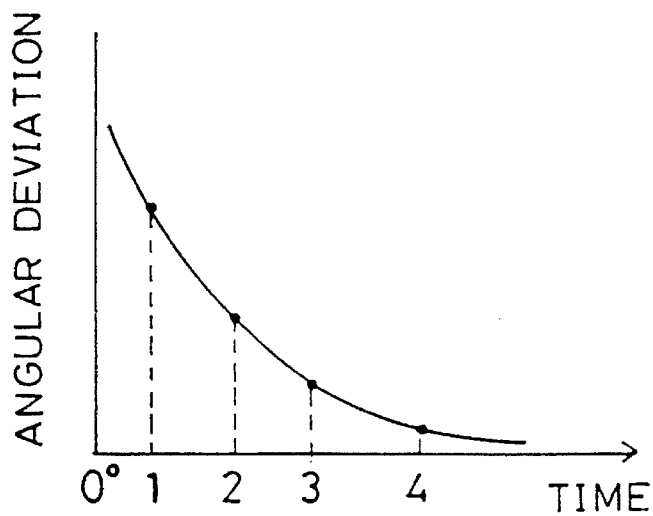
FIG. 7 is a diagram showing the relationship between angular deviation and leveling time.

FIG. 7 shows the relationship between angular deviation and time. Based on this relationship, the position at which a change in the display content is set in advance. When the angular deviation reaches the preset position, the display is switched over, and the operators are informed of the progress of the leveling operation.

Next, description will be given in the case where the reference plane formed by the laser beam is set to an arbitrary angle after a horizontal reference plane has been formed as described above.

The target tilt value of the reference plane is inputted to the tilt driving circuits 83 and 84 by the arbitrary angle setters 81 and 82.

It is judged whether the detection results of the fixed level vial 20 and the arbitrary angle setting level vial 65 or the fixed level vial 21 and the arbitrary angle setting level vial 66 are the same or not, and these are further aligned. In this case, it is preferable that the fixed level vials 20 and 21 are at horizontal position, but it may not necessarily be horizontal if it is not in saturated condition.

When the outputs of the two fixed level vials and the two arbitrary setting level vials agree with each other, the arbitrary angle setting level vials 65 and 66 are tilted in such manner that agreement is reached with the angle set by the arbitrary angle setters 81 and 82. Further, when the laser projector 10 is tilted in such manner that the arbitrary angle setting level vials 65 and 66 become horizontal, the rotating axis center of the laser projector 10 forms the desired arbitrary angle reference plane. When reference plane is formed by rotating the laser projector 10, the desired laser beam reference plane is formed.

Further, a more concrete explanation will now be given. Since the angle setting operation for the arbitrary angle setting level vial 65 and the angle setting operation for the arbitrary angle setting level vial 66 are the same, description will be given only with respect to the arbitrary angle setting level vial 65.

Switching signal is inputted to the switching circuit 85 from an input unit or a control unit (not shown), and the signal from the fixed level vial 20 and the signal from the arbitrary angle setting level vial 65 are inputted to the angle detection circuit 87. In the angle detection circuit 87, deviation of angles detected by the two level vials 20 and 65 is obtained. If there is deviation, the deviation signal is inputted to the tilt driving circuit 83.

The tilt driving circuit 83 drives the tilting motor 58. By the driving of the tilting motor 58, the tilting gear 56 is rotated. The rotation of the tilting gear 56 is transmitted to the tilting screw 52 via the tilting gear 54, and the tilting nut 48 is moved up or down in the desired direction. By engagement of the nut pin 50 of the tilting nut 48 with the tilting pin 60, the tilting plate 62 is tilted toward the direction to lead the deviation to 0.

The tilting of the tilting plate 62 is detected by the arbitrary angle setting level vial 65 and is inputted to the angle detection circuit 87 via switching circuit 85.

By the angle detection circuit 87, deviation of the detection angle of the fixed level vial 20 and the arbitrary angle setting level vial 65 is gradually calculated. The calculated angular deviation is fed back to the tilt driving circuit 83, and the tilting motor 58 is driven until the calculated angular deviation becomes 0.

When calculated angular deviation becomes 0, the axis of the laser projector 10 and the plane detected by the arbitrary angle setting level vials 65 and 66 are perpendicular to each other.

Next, setting angle is inputted from the arbitrary angle setter 81 to the tilt driving circuit 83, and tilt reference plane setting operation is started.

In the tilt driving circuit 83, the tilting motor 58 is driven to reach an angle corresponding to the setting angle inputted by the arbitrary angle setter 81, and the tilting plate 62 is tilted in a direction reverse to the desired tilt reference plane.

Here, the tilting motor 58 uses a pulse motor, for example, and the tilt driving circuit 83 memorizes the tilt angle of the tilting plate 62 and the number of pulses of pulse motor necessary for tilting in advance. The number of pulses corresponding to the angle set by the arbitrary angle setter 81 is outputted to drive the tilting motor 58.

By the tilting motor 58, the tilting screw 52 is rotated, and the tilting nut 48 is moved toward the desired direction, e.g. in downward direction.

The movement of the tilting nut 48 is transmitted to the tilting plate 62 via the nut pin 50 and the tilting pin 60 as described above, and the tilting plate 62 is tilted counterclockwise in FIG. 1 around the sphere 67.

As described above, the tilting pin 60 is guided by the guide pin 71 and tilted only in vertical direction. Therefore, the tilting of the tilting pin 60 does not give influence on the tilting of the arbitrary angle setting level vial 66.

By the tilting of the tilting plate 62, output value from the angle detection circuit 87 is changed, and the comparison results calculated in the tilt driving circuit 83 decrease.

When the comparison results become 0, the driving of the tilting motor 58 stops, and tilt setting of the tilting plate 62 is completed. The signal of this completion is also inputted to the switching circuit 85, and the circuit is switched over in such manner that only the signal from the arbitrary angle setting level vial 65 is inputted to the reference angle 91.

The tilting operation for the arbitrary angle setting level vial 66 is also performed in similar manner, but the titling operation of the arbitrary angle setting level vial 66 does not influence the arbitrary angle setting level vial 65 because the tilting pin 60 is guided by the guide pin 71 as described above. Thus, it is possible to independently control the tilting operations in two directions of the tilting plate 62, and control sequence for the tilting operation in two directions of the tilting plate 62 is simplified.

When in the tilt setting operation of the tilting plate 62 is completed, the tilting operation of the laser projector 10 is started to set the tilt reference plane based on the detection results of the arbitrary angle setting level vial 65. The setting of the tilting operation of the laser projector 10 is performed in such manner that the detection results of the arbitrary angle setting level vial 65 become horizontal, but this operation is the same as the leveling operation based on the fixed level vials 20 and 21, and detailed description is not given here.

Figure 5:
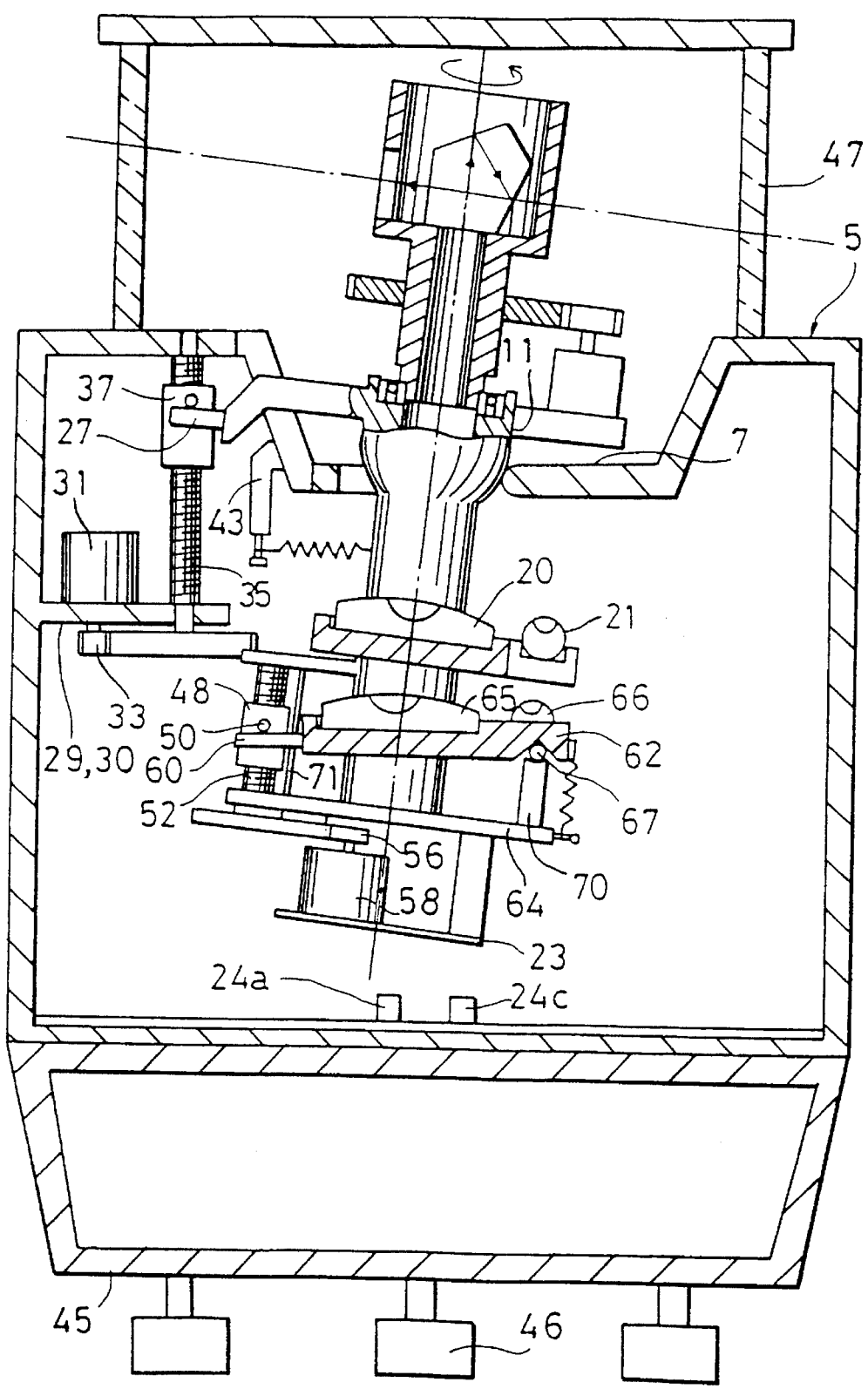
FIG. 5 is a cross-sectional view of the embodiment of FIGS. 1–4 in a condition where reference plane of arbitrary angle is formed.

FIG. 5 shows the condition where the setting operation of the tilt reference plane has been completed. When the setting operation of the tilt reference plane has been completed, the tilting plate 62 is at horizontal position.

The alignment of the fixed level vial 20 and the arbitrary angle setting level vial 65 is performed to ensure the tilting accuracy of the tilting plate 62, and this may be performed each time the titling operation is performed or after it has been repeated by as may times as desired.

Figure 8:
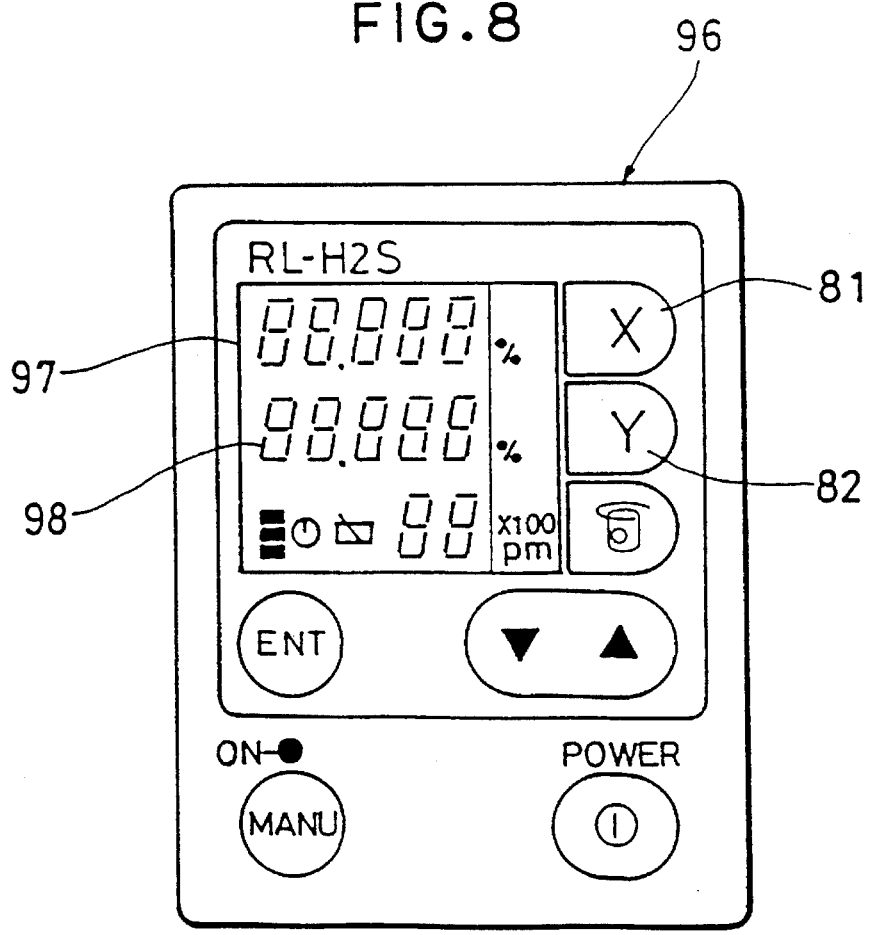
FIG. 8 is a drawing of an example of a controller.

FIG. 8 shows an example of a controller 96 with built-in arbitrary angle setters 81 and 82, and tilting of the tilting plate 62 is supported by the tilting two axes, X-Y. The preset numerical value is displayed on display units 97 and 98.

In the above embodiment, the spherical portion 11a is supported by the projections 9 and 3 points, but it may be supported by the projections at 4 points or more. The projections 9 are designed as protruding from the inner periphery of the support seat 7, but other parts such as steel ball may be buried. Or, buried steel ball may be rotated freely. In the above description, a horizontal plane is used as a reference plane, but it is needless to say that a plane tilted at a given angle to a horizontal plane may be used as a reference plane. In the above embodiment, a reference plane is formed by scanning the laser beam, but the laser beam may be directed onto a conical prism, and the laser beam may be spread over the entire periphery by the reflecting surface of the conical prism to form the reference plane. Further, in the above embodiment, the laser beam is projected upwardly, but it may be projected in a downward direction. Not only a reference plane, but a reference line may be formed by the laser beam.

The arbitrary angle setting level vials 65 nd 66 are mounted on a single tilting plate 62 and the tilting plate 62 is made freely tiltable in two directions, whereas the arbitrary angle setting level vials 65 and 66 may be mounted on two independent plates, and the two plates may be tilted in two different directions. Further, it is needless to say that the freely tiltable supporting means can be modified in various ways.

Further, when a horizontal reference plane is formed, the fixed level vials 20 and 21 may be aligned with the arbitrary angle setting level vials 65 and 66, and a leveling operation may be performed to form a horizontal reference plane based on the detection results of the arbitrary angle setting level vials 65 and 66.

As described above, it is possible according to the present invention to set an accurate reference plane at all times and to eliminate error easily without accumulating errors even when the laser projector is tilted at an arbitrary angle and to repeatedly set the reference plane of arbitrary angle.

What we claim is:

1. A laser beam survey instrument, comprising a laser projector having a laser beam axis tiltable at least in one direction, at least one fixed tilt detector fixed on said laser projector in a plane crossing perpendicularly to the laser beam axis of the laser projector, a base plate placed tiltably with respect to the laser beam axis of the laser projector, and at least one tilt detector arranged on said base plate.

2. A laser beam survey instrument according to claim 1, wherein there is provided means for tilting said at least one tilt detector in such a manner that deviation of said at least one fixed tilt detector and said at least one tilt detector is a predetermined value.

3. A laser beam survey instrument according to claim 1, wherein there is provided means for tilting the laser projector based on at least one of the at least one fixed tilt detector and the at least one tilt detector.

4. A laser beam survey instrument according to claim 1, wherein there are provided a reflection mirror flange mounted in the laser projector which is concentric to said laser projector and optical sensors provided to match said flange, so as to detect a limit of mechanical adjustment range of the laser projector.

5. A laser beam survey instrument according to claim 1, wherein the laser projector can be freely tilted.

6. A laser beam survey instrument according to claim 5, wherein there is provided tilting means for tilting the laser projector independently in two directions, and said tilting means performs leveling operation according to signal from the fixed tilt detector.

7. A laser beam survey instrument according to claim 6, wherein there is provided a display unit for displaying progress of the leveling operation.

\* \* \* \* \*